(12) United States Patent
Kimura

(10) Patent No.: US 8,867,147 B2
(45) Date of Patent: Oct. 21, 2014

(54) IMAGING LENS, OPTICAL APPARATUS EQUIPPED THEREWITH AND METHOD FOR MANUFACTURING IMAGING LENS

(71) Applicant: Nikon Corporation, Tokyo (JP)

(72) Inventor: Yoko Kimura, Ayase (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/911,005

(22) Filed: Jun. 5, 2013

(65) Prior Publication Data

US 2013/0265653 A1 Oct. 10, 2013

Related U.S. Application Data

(63) Continuation of application No. 13/166,669, filed on Jun. 22, 2011, now abandoned.

(30) Foreign Application Priority Data

| Jun. 23, 2010 | (JP) | 2010-142560 |
| Jun. 23, 2010 | (JP) | 2010-142561 |
| Jun. 3, 2011 | (JP) | 2011-124765 |
| Jun. 3, 2011 | (JP) | 2011-124766 |

(51) Int. Cl.
*G02B 15/14* (2006.01)
*G02B 3/04* (2006.01)
*G02B 13/04* (2006.01)

(52) U.S. Cl.
CPC . *G02B 3/04* (2013.01); *G02B 13/04* (2013.01)
USPC .......................................................... 359/691

(58) Field of Classification Search
USPC .................................. 359/680–682, 749–753
See application file for complete search history.

(56) References Cited

U.S. PATENT DOCUMENTS

| 5,218,480 | A | 6/1993 | Moskovich |
| 5,321,554 | A | 6/1994 | Ishiyama et al. |
| 7,777,967 | B2 * | 8/2010 | Hirakawa ...................... 359/684 |
| 2001/0030812 | A1 | 10/2001 | Furuta |
| 2005/0041302 | A1 | 2/2005 | Ozaki et al. |
| 2005/0200967 | A1 | 9/2005 | Yamasaki et al. |

FOREIGN PATENT DOCUMENTS

| JP | 05-241070 A | 9/1993 |
| JP | 2002-303790 A | 10/2002 |
| JP | 2008-170720 A | 7/2008 |

* cited by examiner

*Primary Examiner* — Ricky Mack
*Assistant Examiner* — Robert E Tallman
(74) *Attorney, Agent, or Firm* — Miles & Stockbridge P.C.

(57) ABSTRACT

An imaging lens SL installed in a single-lens reflex digital camera includes, in order from an object side, a first lens group G1, and a second lens group G2 having positive refractive power. The first lens group G1 includes, in order from the object side, a first lens component L11 having a negative meniscus shape with a convex surface facing the object side, a second lens component L12 having a negative meniscus shape with a convex surface facing the object side, and a third lens component L13. The third lens component L13 includes a double concave lens to the most object side. The imaging lens SL includes at least six lens components or more, thereby providing a sufficiently fast imaging lens having excellent optical performance, which is a large aperture, single-focal-length, wide-angle lens having an aspherical surface.

26 Claims, 13 Drawing Sheets

IMAGING LENS, OPTICAL APPARATUS EQUIPPED THEREWITH AND METHOD FOR MANUFACTURING IMAGING LENS

The disclosure of the following priority applications are herein incorporated by reference:

Japanese Patent Application No. 2010-142560 filed on Jun. 23, 2010;

Japanese Patent Application No. 2010-142561 filed on Jun. 23, 2010;

Japanese Patent Application No. 2011-124765 filed on Jun. 3, 2011; and

Japanese Patent Application No. 2011-124766 filed on Jun. 3, 2011.

BACKGROUND OF THE INVENTION

1. Field of the Invention

The present invention relates to an imaging lens equipped with the imaging lens, and a method for manufacturing the imaging lens.

2. Related Background Art

So-called retrofocus-type wide-angle lenses with a front lens group having negative refractive power have been known as a single focal length wide-angle lens. Among them, there have been proposed those including an aspherical surface in spite of a small number thereof (for example, see Japanese Patent Application Laid-Open Nos. 2008-170720 and 2002-303790).

However, the conventional technology disclosed in Japanese Patent Application Laid-Open Nos. 2008-170720 and 2002-303790 has only disclosed a wide-angle lens having a full-open f-number of 2.8 or more, and has not proposed a faster, larger aperture wide-angle lens yet.

SUMMARY OF THE INVENTION

The present invention is made in view of the above-described problem and has an object to provide a sufficiently fast imaging lens having excellent optical performance, which is a large aperture, single-focal-length, wide-angle lens having an aspherical surface, an optical apparatus equipped with the imaging lens, and a method for manufacturing the imaging lens.

According to a first aspect of the present invention, there is provided an imaging lens comprising, in order from an object side: a first lens group; and a second lens group having positive refractive power, the first lens group including, in order from the object side, a first lens component having a negative meniscus shape with a convex surface facing the object side, a second lens component having a negative meniscus shape with a convex surface facing the object side, and a third lens component, the third lens component including a double concave lens to the most object side, the imaging lens including at least six lens components or more, and the following conditional expression (1) being satisfied:

$$0.65 < f/(-fa) < 1.15 \qquad (1)$$

where f denotes a focal length of the imaging lens, and fa denotes a combined focal length of the first lens component and the second lens component.

According to a second aspect of the present invention, there is provided an optical apparatus equipped with the imaging lens according to the first aspect.

According to a third aspect of the present invention, there is provided an imaging lens comprising, in order from an object side: a first lens group; and a second lens group having positive refractive power, the first lens group including, in order from the object side, a first lens component, and a second lens component, each of the first lens component and the second lens component including an aspherical surface formed by means of glass molding, and the imaging lens including at least six lens components or more.

According to a fourth aspect of the present invention, there is provided an optical apparatus equipped with the imaging lens according to the third aspect.

According to a fifth aspect of the present invention, there is provided a method for manufacturing an imaging lens including, in order from an object side, a first lens group, and a second lens group having positive refractive power, the method comprising steps of: disposing, in order from the object side, a first lens component with a negative meniscus shape having a convex surface facing the object side, a second lens component with a negative meniscus shape having a convex surface facing the object side, and a third lens component into the first lens group; disposing a double concave lens to the most object side of the third lens component; disposing at least six lens components or more in the imaging lens; and satisfying the following conditional expression (1):

$$0.65 < f/(-fa) < 1.15 \qquad (1)$$

where f denotes a focal length of the imaging lens, and fa denotes a combined focal length of the first lens component and the second lens component.

According to a sixth aspect of the present invention, there is provided a method for manufacturing an imaging lens including, in order from an object side, a first lens group, and a second lens group having positive refractive power, the method comprising steps of: disposing, in order from the object side, a first lens component, and a second lens component into the first lens group; disposing an aspherical surface formed by means of glass molding in each of the first lens component and the second lens component; and disposing at least six lens components or more in the imaging lens.

With constructing an imaging lens, an optical apparatus equipped with the imaging lens, and a method for manufacturing the imaging lens according to the present invention in this manner, it becomes possible to provide a large aperture, single-focal-length wide-angle lens having an aspherical surface, which is sufficiently fast and has excellent optical performance.

DESCRIPTION OF THE MOST PREFERRED EMBODIMENT

A preferred embodiment of the present application is explained below with reference to accompanying drawings. In a design of an objective optical system including a photographic lens, it is extremely difficult to make the optical system a wider angle of view and a larger aperture at the same time. In the present embodiment, a downsized imaging lens capable of being commonly used despite of a wide angle of view and a large aperture, securing sufficient amount of light around a corner and excellent optical performance has been developed with manufacturing an aspherical lens used therein by means of a well productive mass production technique.

At first, a basic configuration of an imaging lens according to the present embodiment is explained.

Figure 1:
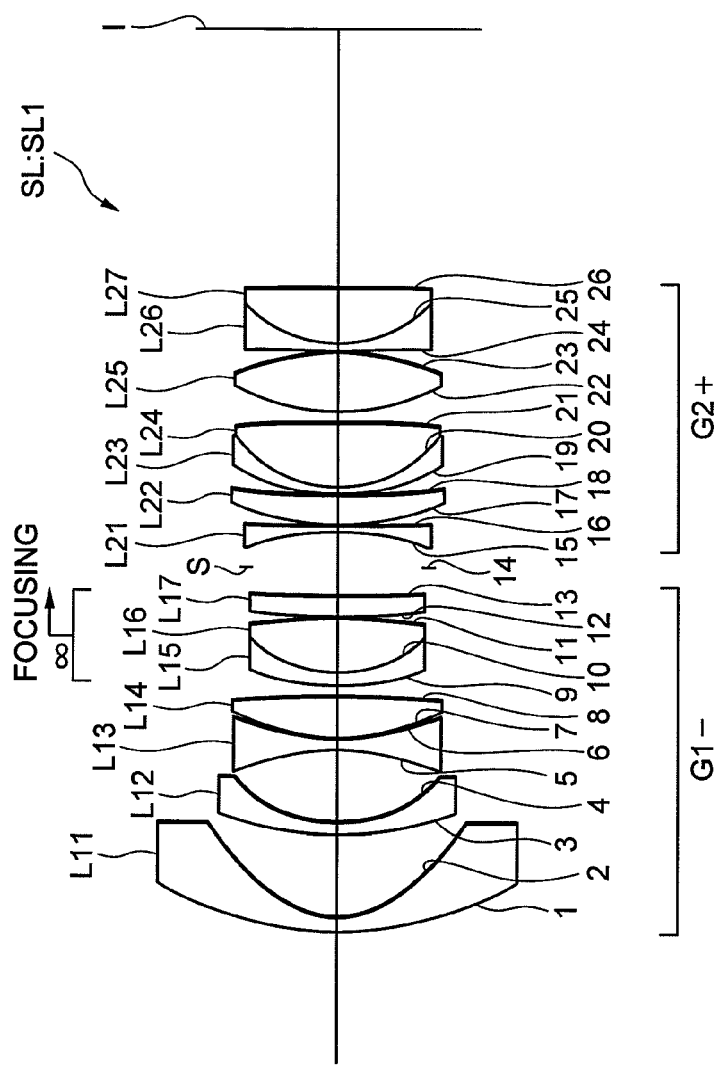
FIG. 1 is a sectional view showing a lens configuration of an imaging lens according to Example 1 of the present application.

As shown in FIG. 1, an imaging lens SL according to the present embodiment is a retrofocus type imaging lens SL composed of, in order from an object side, a first lens group G1, and a second lens group G2 having positive refractive power. The first lens group G1 includes, in order from the object side, a first lens component L11 with a negative meniscus shape having a convex surface facing the object side, a second lens component L12 with a negative meniscus shape having a convex surface facing the object side, and a third lens component L13. The third lens component L13 includes a double concave lens to the most object side. The first lens group G1 further includes a plurality of lenses composed of negative lenses and positive lenses. With this configuration, it becomes possible to excellently correct mainly off-axis aberrations.

At least one of the first lens component L11 and the second lens component L12 includes an aspherical surface, so that aberrations can be excellently corrected and the imaging lens can be downsized.

Moreover, with forming the aspherical surface by means of glass molding, it becomes possible to provide a high-precision product at a reasonable cost.

Moreover, an imaging lens SL according to the present embodiment is composed of six lens components or more. Incidentally, each lens component may be constructed by a single lens, or a cemented lens. Accordingly, in imaging lenses SL shown in FIGS. 3 and 5 in addition to the imaging lens SL shown in FIG. 1, the third lens component is composed of a single lens (a double concave lens L13). However, in imaging lenses SL shown in FIGS. 7 and 9, the third lens component is composed of a cemented lens constructed by a double concave lens L13 cemented with a double convex lens L14. Moreover, in an imaging lens SL according to the present embodiment, a focal length does not vary except upon focusing. With this configuration, it becomes possible to provide an imaging lens SL having a single focal length, a wide angle of view and a large aperture.

Moreover, in an imaging lens SL according to the present embodiment, although an aperture stop S is preferably disposed between the first lens group G1 and the second lens group G2, the function may be substituted by a lens frame without disposing a member as an aperture stop.

In an imaging lens SL according to the present embodiment, upon carrying out focusing from an infinitely distant object to a close object, a distance between the first lens group G1 and the second lens group G2 is preferably fixed, and each distance between respective lenses in the first lens group G1 and the second lens group G2 is preferably fixed as well. With this configuration, the mechanism can be simplified, assembling becomes easy, and deterioration in optical performance upon assembling becomes small, so that excellent optical performance can be obtained.

Conditions for constructing such an imaging lens SL are explained below. In an imaging lens SL according to the present embodiment, the following conditional expression (1) is preferably satisfied:

$$0.65 < f/(-fa) < 1.15 \tag{1}$$

where f denotes a focal length of the imaging lens, and fa denotes a combined focal length of the first lens component L11 and the second lens component L12 in the first lens group G1.

Conditional expression (1) is a relational expression between the focal length of the imaging lens and the combined focal length of the first lens component L11 and the second lens component L12, and defines optimum power distribution of the whole lens system. When the ratio f/(−fa) is equal to or exceeds the upper limit of conditional expression (1), combined power of the first lens component L11 and the second lens component L12 becomes relatively strong with respect to the focal length of the whole lens system, so that curvature of field and coma become over-correction. In particular, sagittal coma and curvature of field become worse, so that it is undesirable. In order to secure the effect of the present embodiment, it is preferable to set the upper limit of conditional expression (1) to 1.09. In order to further secure the effect of the present embodiment, it is most preferable to set the upper limit of conditional expression (1) to 1.00. On the other hand, when the ratio f/(−fa) is equal to or falls below the lower limit of conditional expression (1), combined power of the first lens component L11 and the second lens component L12 becomes relatively weak with respect to the focal length of the whole lens system, so that curvature of field and coma become under-correction. In particular, sagittal coma becomes worse. Moreover, since insufficient power is forcibly corrected by the second lens group G2, spherical aberration also becomes worse, so that it is undesirable. In order to secure the effect of the present embodiment, it is preferable to set the lower limit of conditional expression (1) to 0.75. In order to further secure the effect of the present embodiment, it is most preferable to set the lower limit of conditional expression (1) to 0.85.

In an imaging lens SL according to the present embodiment, the following conditional expression (2) is preferably satisfied:

$$0.40 < f/(-f1) < 0.75 \tag{2}$$

where f denotes a focal length of the whole lens system, and f1 denotes a focal length of the first lens component L11.

Conditional expression (2) is a relational expression between the focal length of the whole lens system and the focal length of the first lens component L11, and defines optimum power distribution of the whole lens system. When the ratio f/(−f1) is equal to or exceeds the upper limit of conditional expression (2), power of the first lens component L11 becomes relatively strong with respect to the focal length of the whole lens system, so that curvature of field and coma become over-correction. In particular, sagittal coma and curvature of field become worse, so that it is undesirable. In order to secure the effect of the present embodiment, it is preferable to set the upper limit of conditional expression (2) to 0.70. In order to further secure the effect of the present embodiment, it is most preferable to set the upper limit of conditional expression (2) to 0.65. On the other hand, when the ratio f/(−f1) is equal to or falls below the lower limit of conditional expression (2), power of the first lens component L11 becomes relatively weak with respect to the focal length of the whole lens system, so that curvature of field and coma become under-correction. In particular, sagittal coma becomes worse. Moreover, since insufficient power is forcibly corrected by the second lens group G2, spherical aberration also becomes worse, so that it is undesirable. In order to secure the effect of the present embodiment, it is preferable to set the lower limit of conditional expression (2) to 0.45. In order to further secure the effect of the present embodiment, it is most preferable to set the lower limit of conditional expression (2) to 0.50.

In an imaging lens SL according to the present embodiment, the following conditional expression (3) is preferably satisfied:

$$-4.0 < (r2+r1)/(r2-r1) < -1.1 \quad (3)$$

where r1 denotes a radius of curvature of the object side lens surface of the first lens component L11, and r2 denotes a radius of curvature of the image side lens surface of the first lens component L11.

Conditional expression (3) defines the optimum shape of the first lens component L11. When the value (r2+r1)/(r2−r1) is equal to or exceeds the upper limit of conditional expression (3), power of the first lens component L11 on the whole becomes large, and curvature of field, coma and distortion cannot be excellently corrected, so that it is undesirable. In order to secure the effect of the present embodiment, it is preferable to set the upper limit of conditional expression (3) to −1.3. In order to further secure the effect of the present embodiment, it is most preferable to set the upper limit of conditional expression (3) to −1.5. On the other hand, when the value (r2+r1)/(r2−r1) is equal to or falls below the lower limit of conditional expression (3), power of the first lens component L11 becomes small. Accordingly, it becomes difficult to realize a wider angle of view, and curvature of field, coma and distortion cannot be excellently corrected, so that it is undesirable. In order to secure the effect of the present embodiment, it is preferable to set the lower limit of conditional expression (3) to −3.0. In order to further secure the effect of the present embodiment, it is most preferable to set the lower limit of conditional expression (3) to −2.5.

In an imaging lens SL according to the present embodiment, the following conditional expression (4) is preferably satisfied:

$$0.10 < f1/f2 < 1.00 \quad (4)$$

where f1 denotes a focal length of the first lens component L11, and f2 denotes a focal length of the second lens component L12.

Conditional expression (4) is a relational expression between the focal length of the first lens component L11 and the focal length of the second lens component L12, and defines optimum power distribution. When the ratio f1/f2 is equal to or exceeds the upper limit of conditional expression (4), power of the second lens component L12 becomes larger than the power of the first lens component L11, and curvature of field, coma and distortion becomes difficult to be corrected in well-balanced manner, so that it is undesirable. In order to secure the effect of the present embodiment, it is preferable to set the upper limit of conditional expression (4) to 0.85. In order to further secure the effect of the present embodiment, it is most preferable to set the upper limit of conditional expression (4) to 0.65. On the other hand, when the ratio f1/f2 is equal to or falls blow the lower limit of conditional expression (4), power of the second lens component L12 becomes small with respect to the power of the first lens component L11, and curvature of field, coma and distortion becomes impossible to be excellently corrected, so that it is undesirable. In order to secure the effect of the present embodiment, it is preferable to set the lower limit of conditional expression (4) to 0.15. In order to further secure the effect of the present embodiment, it is most preferable to set the lower limit of conditional expression (4) to 0.20.

Figure 12:
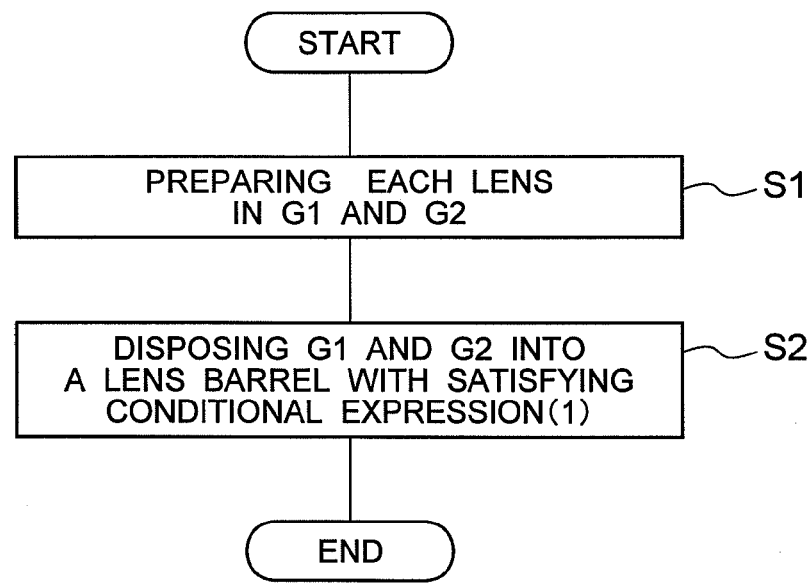
FIG. 12 is a flowchart showing a method for manufacturing an imaging lens according to the present embodiment.

Then, an outline of a method for manufacturing an imaging lens SL according to the present embodiment is explained with reference to FIG. 12.

At first, each lens group is provided with each lens into the lens group (Step S1). Specifically, in the present embodiment, the first lens group G1 is prepared by disposing, in order from an object side, a negative meniscus lens L11 (first lens component) having a convex surface facing the object side, a negative meniscus lens L12 (second lens component) having a convex surface facing the object side, a double concave lens L13 (third lens component), a double convex lens L14, a cemented lens constructed by a negative meniscus lens L15 having a convex surface facing the object side cemented with a double convex lens L16, and a positive meniscus lens L17 having a convex surface facing the object side. The second lens group G2 is prepared by disposing, in order from the object side, a double concave lens L21, a positive meniscus lens L22 having a convex surface facing the object side, a cemented lens constructed by a negative meniscus lens L23 having a convex surface facing the object side cemented with a double convex lens L24, a double convex lens L25, and a cemented lens constructed by a negative meniscus lens L26 having a convex surface facing the object side cemented with a double convex lens L27.

Secondly, the imaging lens SL is manufactured by disposing each lens group prepared in this manner into a lens barrel with satisfying the above described conditional expression (1) (Step S2).

Then, a basic configuration of an imaging lens seen from another point of view according to the present embodiment is explained. As shown in FIG. 1, an imaging lens SL seen from another point of view according to the present embodiment is a retrofocus type imaging lens SL composed of, in order from an object side, a first lens group G1, and a second lens group G2 having positive refractive power. The first lens group G1 is composed of, in order from the object side, a first lens L11 having negative refractive power, a second lens L12 having negative refractive power, and a plurality of lenses composed of negative lenses and positive lenses. Moreover, each of the first lens L11 and the second lens L12 includes an aspherical surface formed by means of glass molding, thereby excellently correcting mainly off-axis aberrations and realizing a downsized imaging lens SL. Moreover, aspherical surfaces in the first lens L11 and the second lens L12 are formed by means of glass molding, so that it becomes possible to provide a high-precision product at a reasonable cost.

Moreover, an imaging lens SL seen from another point of view according to the present embodiment is composed of six lens components or more. Incidentally, each lens component may be constructed by a single lens, or a cemented lens. Moreover, in an imaging lens SL seen from another point of view according to the present embodiment, a focal length does not vary except upon focusing. With this configuration, it becomes possible to provide an imaging lens SL having a single focal length, a wide angle of view and a large aperture.

Moreover, in an imaging lens SL seen from another point of view according to the present embodiment, although an aperture stop S is preferably disposed between the first lens group G1 and the second lens group G2, the function may be substituted by a lens frame without disposing a member as an aperture stop.

In an imaging lens SL seen from another point of view according to the present embodiment, upon carrying out focusing from an infinitely distant object to a close object, a distance between the first lens group G1 and the second lens group G2 is preferably fixed, and each distance between respective lenses in the first lens group G1 and the second lens group G2 is preferably fixed. With this configuration, the mechanism can be simplified, assembling becomes easy, and deterioration in optical performance upon assembling becomes small, so that excellent optical performance can be obtained.

In an imaging lens SL seen from another point of view according to the present embodiment, each of the first lens L11 and the second lens L12 in the first lens group G1 is preferably a negative meniscus lens having a convex surface facing the object side. With this configuration, generation of various aberrations can be suppressed.

In an imaging lens SL seen from another point of view according to the present embodiment, an aspherical surface formed by means of glass molding is preferably an image side lens surface of at least one of the first lens L11 and the second lens L12. With this configuration, optical performance can be excellently improved.

Conditions for constructing such an imaging lens SL seen from another point of view are explained below. In an imaging lens SL seen from another point of view according to the present embodiment, the following conditional expression (1) is preferably satisfied:

$$0.65 < f/(-fa) < 1.15 \qquad (1)$$

where f denotes a focal length of the imaging lens, and fa denotes a combined focal length of the first lens L11 and the second lens L12 in the first lens group G1.

Conditional expression (1) is a relational expression between the focal length of the imaging lens and the combined focal length of the first lens L11 and the second lens L12, and defines optimum power distribution of the whole lens system. However, conditional expression (1) has already been explained above, so that duplicated explanations are omitted.

In an imaging lens SL seen from another point of view according to the present embodiment, the following conditional expression (2) is preferably satisfied:

$$0.40 < f/(-f1) < 0.75 \qquad (2)$$

where f denotes a focal length of the whole lens system, and f1 denotes a focal length of the first lens L11.

Conditional expression (2) is a relational expression between the focal length of the imaging lens and the focal length of the first lens L11, and defines optimum power distribution of the whole lens system. However, conditional expression (2) has already been explained above, so that duplicated explanations are omitted.

In an imaging lens SL seen from another point of view according to the present embodiment, the following conditional expression (3) is preferably satisfied:

$$-4.0 < (r2+r1)/(r2-r1) < -1.1 \qquad (3)$$

where r1 denotes a radius of curvature of the object side lens surface of the first lens L11, and r2 denotes a radius of curvature of the image side lens surface of the first lens L11.

Conditional expression (3) defines the optimum shape of the first lens L11. However, conditional expression (3) has already been explained above, so that duplicated explanations are omitted.

In an imaging lens SL seen from another point of view according to the present embodiment, the following conditional expression (4) is preferably satisfied:

$$0.10 < f1/f2 < 1.00 \qquad (4)$$

where f1 denotes a focal length of the first lens L11, and f2 denotes a focal length of the second lens L12.

Conditional expression (4) is a relational expression between the focal length of the first lens L11 and the focal length of the second lens L12, and defines optimum power distribution in the whole lens system. However, conditional expression (4) has already been explained above, so that duplicated explanations are omitted.

Figure 13:
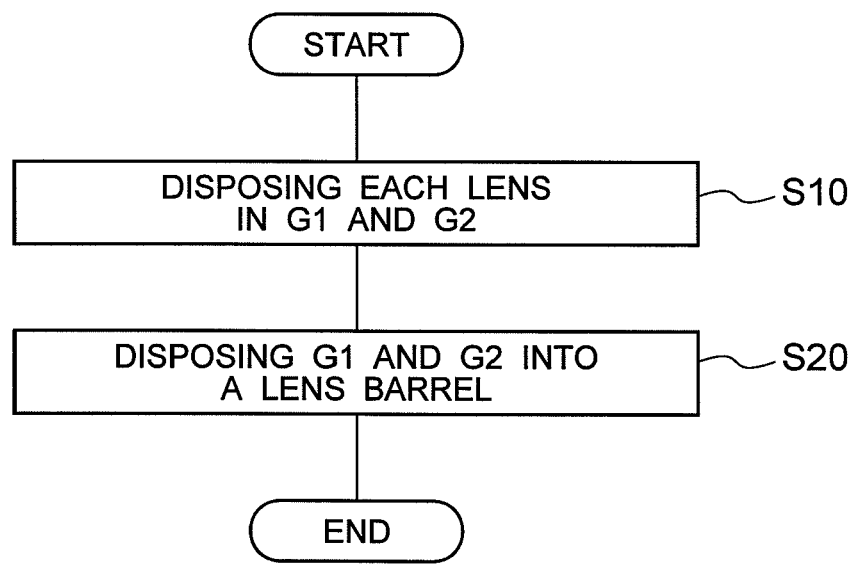
FIG. 13 is a flowchart showing a method for manufacturing an imaging lens seen from another point of view according to the present embodiment.

Then, an outline of a method for manufacturing an imaging lens SL seen from another point of view according to the present embodiment is explained with reference to FIG. 13.

At first, each lens group is provided with each lens into the lens group (Step S10). Specifically, in an imaging lens SL seen from another point of view according to the present embodiment, the first lens group G1 is prepared by disposing, in order from an object side, a negative meniscus lens L11 (first lens) having a convex surface facing the object side, a negative meniscus lens L12 (second lens) having a convex surface facing the object side, a double concave lens L13, a double convex lens L14, a cemented lens constructed by a negative meniscus lens L15 having a convex surface facing the object side cemented with a double convex lens L16, and a positive meniscus lens L17 having a convex surface facing the object side. The second lens group G2 is prepared by disposing, in order from the object side, a double concave lens L21, a positive meniscus lens L22 having a convex surface facing the object side, a cemented lens constructed by a negative meniscus lens L23 having a convex surface facing the object side cemented with a double convex lens L24, a double convex lens L25, and a cemented lens constructed by a negative meniscus lens L26 having a convex surface facing the object side cemented with a double convex lens L27.

Secondly, the imaging lens SL seen from another point of view is manufactured by disposing each lens group prepared in this manner into a lens barrel (Step S20).

Each numerical example according to the present invention is explained below with reference to accompanying drawings. Configurations of imaging lenses SL1 through SL5 are shown in FIGS. 1, 3, 5, 7 and 9, respectively. As shown in respective drawings, an imaging lens SL according each Example is composed of, in order from an object side, a first lens group G1, and a second lens group G2 having positive refractive power. In each Example, an aperture stop S is disposed between the first lens group G1 and the second lens group G2.

In each of Examples, an aspherical surface is expressed by the following expression (a) where y is a height in the direction vertical to the optical axis, S(y) is a distance (sag amount) along the optical axis from a tangent plane of a vertex of each aspherical surface at the height y up to each aspherical surface, r is a radius of curvature (paraxial radius of curvature) of the reference sphere, k is a conical coefficient and An is an n-th order aspherical surface coefficient:

$$S(y)=(y^2/r)/[1+(1-\kappa \times y^2/r^2)^{1/2}]+A4 \times y^4+A6 \times y^6+A8 \times y^8+A10 \times y^{10}$$ (a).

It should be noted that a second order aspherical coefficient A2 is "0" in each Example. Further, an aspherical surface is attached with a mark "*" on the left side of the surface number in (Lens Data) of each Example. Note that [E–n] represents [×10$^{-n}$] in the subsequent Examples.

Example 1

FIG. 1 is a sectional view showing a lens configuration of an imaging lens SL1 according to Example 1 of the present application. In the imaging lens SL1 shown in FIG. 1, the first lens group G1 is composed of, in order from an object side, a negative meniscus lens L11 (first lens component or first lens) having a convex surface facing the object side, a negative meniscus lens L12 (second lens component or second lens) having a convex surface facing the object side, a double concave lens L13 (third lens component), a double convex lens L14, a cemented lens constructed by a negative meniscus lens L15 having a convex surface facing the object side cemented with a double convex lens L16, and a positive meniscus lens L17 having a convex surface facing the object side. Each of the negative meniscus lens L11 having a convex surface facing the object side and the negative meniscus lens L12 having a convex surface facing the object side includes an aspherical surface formed by means of glass molding on the image side lens surface.

The second lens group G2 is composed of, in order from the object side, a double concave lens L21, a positive meniscus lens L22 having a convex surface facing the object side, a cemented lens constructed by a negative meniscus lens L23 having a convex surface facing the object side cemented with a double convex lens L24, a double convex lens L25, and a cemented lens constructed by a negative meniscus lens L26 having a convex surface facing the object side cemented with a double convex lens L27. The negative meniscus lens L26 having a convex surface facing the object side includes an aspherical surface on the object side lens surface.

In the imaging lens SL1 according to Example 1, the cemented lens constructed by the negative meniscus lens L15 having a convex surface facing the object side cemented with the double convex lens L16, and the positive meniscus lens L17 having a convex surface facing the object side in the first lens group G1 are moved to the image plane side, thereby carrying out focusing from an infinitely distant object to a close object.

Various values associated with the imaging lens SL1 according to Example 1 are listed in Table 1.

In (Specifications), "f" denotes a focal length, "2ω" denotes an angle of view, and "FNO" denotes an f-number. In (Lens Data), the left most column "i" shows the lens surface number counted in order from the object side, the second column "r" shows a radius of curvature of the lens surface, the third column "d" shows a distance to the next surface, the fourth column "vd" shows an Abbe number at d-line (wavelength λ=587.6 nm), and the fifth column "nd" shows a refractive index at d-line (wavelength λ=587.6 nm). In the third column "d", "Bf" denotes a back focal length. In the fifth column "nd", a refractive index of the air nd=1.000000 is omitted. In the second column "r", r=∞ shows a plane surface. An aspherical surface is expressed by attaching "*" to the left side of the lens surface number.

In (Lens Group Data), a starting surface number "I" and a focal length of each lens group are shown.

In (Variable Distances), "INF" denotes a state upon focusing on an infinitely distant object, "CLD" denotes a state upon focusing on a close object, and "β." denotes a shooting magnification.

In (Values for Conditional Expressions), values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples.

TABLE 1

(Specifications)
f = 18.4
2ω = 100.3°
FNO = 1.84

(Lens Data)

| i | r | d | νd | nd |
|---|---|---|---|---|
| 1 | 57.119 | 2.50 | 55.34 | 1.67790 |
| *2 | 15.500 | 12.56 | | |
| 3 | 55.930 | 2.00 | 52.64 | 1.74100 |
| *4 | 25.916 | 10.96 | | |
| 5 | −41.336 | 2.00 | 82.52 | 1.49782 |
| 6 | 42.788 | 0.10 | | |
| 7 | 39.300 | 6.64 | 39.58 | 1.80440 |
| 8 | −166.812 | (d8) | | |
| 9 | 42.931 | 2.00 | 42.71 | 1.83481 |
| 10 | 20.000 | 8.75 | 47.04 | 1.62374 |
| 11 | −81.122 | 0.10 | | |
| 12 | 169.295 | 3.24 | 64.10 | 1.51680 |
| 13 | 314.929 | (d13) | | |
| 14 | ∞ | 5.67 | Aperture Stop S | |
| 15 | −43.335 | 1.00 | 42.72 | 1.83481 |
| 16 | 293.607 | 0.10 | | |
| 17 | 43.567 | 4.62 | 50.80 | 1.57099 |
| 18 | 118.468 | 0.10 | | |
| 19 | 33.408 | 1.00 | 49.45 | 1.77279 |
| 20 | 20.000 | 10.42 | 82.52 | 1.49782 |
| 21 | −161.758 | 1.57 | | |
| 22 | 35.268 | 9.59 | 82.52 | 1.49782 |
| 23 | −38.947 | 0.10 | | |
| *24 | 157.428 | 1.00 | 40.92 | 1.80610 |
| 25 | 20.000 | 8.77 | 61.13 | 1.58913 |
| 26 | −520.433 | (Bf) | | |

(Lens Group Data)

| Group | I | focal length |
|---|---|---|
| G1 | 1 | −329.29 |
| G2 | 15 | 44.92 |

(Aspherical Surface Data)

Surface Number: 2

κ = 0.1077
A4 = 6.43851E−06

TABLE 1-continued (Specifications)
f = 18.4
2ω = 100.3°
FNO = 1.84

A6 = −1.03467E−08
A8 = 7.31449E−11
A10 = −1.76329E−13
Surface Number: 4

κ = −0.5549
A4 = 1.92571E−05
A6 = 2.19908E−08
A8 = −5.95114E−11
A10 = 5.24054E−13
Surface Number: 24

κ = −190.0565
A4 = −7.21005E−06
A6 = −2.58492E−08
A8 = 3.51696E−11
A10 = 0.00000E+00

(Variable Distances)

|  | INF | CLD |
|---|---|---|
| β = | 0 | −1/30 |
| d0 = | ∞ | 521.48 |
| d8 = | 1.51 | 2.35 |
| d13 = | 4.14 | 3.30 |
| Bf = | 40.00 | 40.00 |

(Values for Conditional Expressions)

(1) $f/(-fa) = 0.97$
(2) $f/(-f1) = 0.57$
(3) $(r2 + r1)/(r2 - r1) = -1.7$
(4) $f1/f2 = 0.48$

Figure 2:
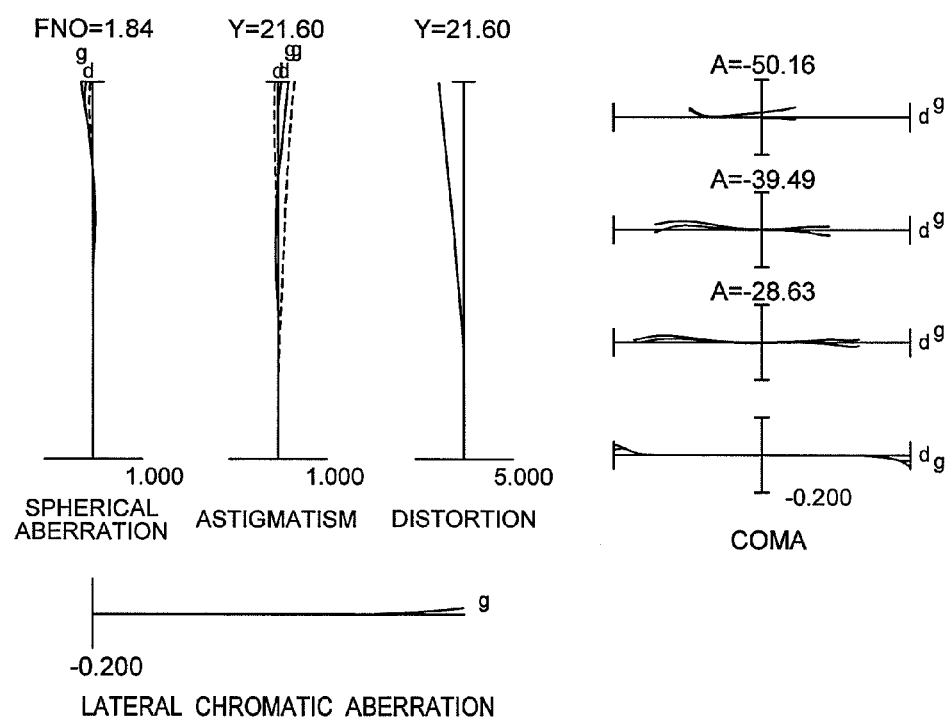
FIG. 2 shows graphs representing various aberrations of the imaging lens according to Example 1 upon focusing on an infinitely distant object.

FIG. 2 shows graphs representing various aberrations of the imaging lens SL1 according to Example 1 upon focusing on an infinitely distant object. In respective graphs, "FNO" denotes an f-number, "Y" denotes an image height, and "A" denotes a half angle of view (unit: degree). In respective graphs, "d" denotes an aberration curve at d-line (wavelength λ=587.6 nm), and "g" denotes an aberration curve at g-line (wavelength λ=435.8 nm). In the graph showing astigmatism, a solid line indicates a sagittal image plane, and a broken line indicates a meridional image plane. As is apparent from FIG. 2, the imaging lens SL1 according to Example 1 shows superb optical performance as a result of good corrections to various aberrations.

Example 2

Figure 3:
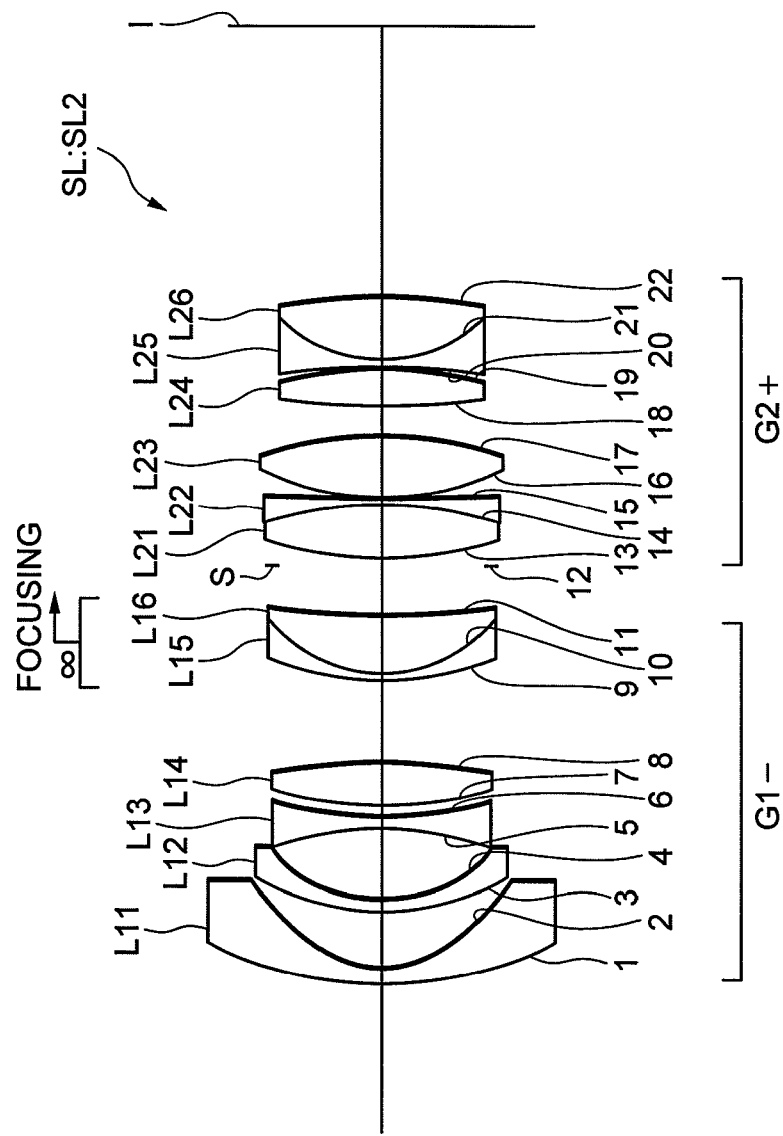
FIG. 3 is a sectional view showing a lens configuration of an imaging lens according to Example 2 of the present application.

FIG. 3 is a sectional view showing a lens configuration of an imaging lens SL2 according to Example 2 of the present application. In the imaging lens SL2 shown in FIG. 3, the first lens group G1 is composed of, in order from an object side, a negative meniscus lens L11 (first lens component or first lens) having a convex surface facing the object side, a negative meniscus lens L12 (second lens component or second lens) having a convex surface facing the object side, a double concave lens L13 (third lens component), a double convex lens L14, and a cemented lens constructed by a negative meniscus lens L15 having a convex surface facing the object side cemented with a positive meniscus lens L16 having a convex surface facing the object side. An aspherical surface formed by means of glass molding is formed on the image side lens surface of each of the negative meniscus lens L11 having a convex surface facing the object side and the negative meniscus lens L12 having a convex surface facing the object side.

The second lens group G2 is composed of, in order from the object side, a cemented lens constructed by a double convex lens L21 cemented with a negative meniscus lens L22 having a concave surface facing the object side, a double convex lens L23, a double convex lens L24, and a cemented lens constructed by a double concave lens L25 cemented with a double convex lens L26. An aspherical surface is formed on the object side lens surface of the double concave lens L25.

In the imaging lens SL2 according to Example 2, the cemented lens constructed by the negative meniscus lens L15 having the convex surface facing the object side cemented with the positive meniscus lens L16 having the convex surface facing the object side in the first lens group is moved to the image plane side, thereby carrying out focusing from an infinitely distant object to a close object.

Various values associated with the imaging lens SL2 according to Example 2 are listed in Table 2.

TABLE 2

(Specifications)
f = 20.4
2ω = 94.7°
FNO = 1.84

(Lens Data)

| i | r | d | νd | nd |
|---|---|---|---|---|
| 1 | 58.184 | 2.50 | 55.34 | 1.67790 |
| *2 | 15.500 | 7.92 | | |
| 3 | 36.850 | 2.00 | 52.64 | 1.74100 |
| *4 | 24.431 | 9.97 | | |
| 5 | −45.723 | 2.00 | 82.52 | 1.49782 |
| 6 | 64.259 | 1.29 | | |
| 7 | 58.335 | 6.52 | 39.58 | 1.80440 |
| 8 | −77.755 | (d8) | | |
| 9 | 44.405 | 1.00 | 42.71 | 1.83481 |
| 10 | 21.000 | 8.44 | 47.04 | 1.62374 |
| 11 | 112.446 | (d11) | | |
| 12 | ∞ | 1.10 | Aperture Stop S | |
| 13 | 51.855 | 7.86 | 82.52 | 1.49782 |
| 14 | −55.109 | 1.00 | 49.45 | 1.77279 |
| 15 | 337.630 | 0.10 | | |
| 16 | 40.646 | 9.15 | 82.52 | 1.49782 |
| 17 | −50.439 | 4.10 | | |
| 18 | 125.172 | 5.52 | 82.52 | 1.49782 |
| 19 | −52.959 | 0.10 | | |
| *20 | −115.391 | 1.00 | 40.92 | 1.80610 |
| 21 | 21.015 | 9.19 | 61.13 | 1.58913 |
| 22 | −72.261 | (Bf) | | |

(Lens Group Data)

| Group | I | focal length |
|---|---|---|
| G1 | 1 | −46.91 |
| G2 | 13 | 39.90 |

(Aspherical Surface Data)

Surface Number: 2

κ = 0.5010
A4 = −7.68272E−06
A6 = −1.86678E−08
A8 = −7.57497E−12
A10 = −1.46293E−13
Surface Number: 4

κ = −0.5449
A4 = 2.20823E−05
A6 = 1.24878E−08
A8 = 1.05153E−10
A10 = −3.04569E−14

TABLE 2-continued (Specifications)
f = 20.4
2ω = 94.7°
FNO = 1.84

Surface Number: 20

κ = 0.0000
A4 = −1.10223E−05
A6 = −8.84178E−10
A8 = −7.31469E−12
A10 = 0.00000E+00

(Variable Distances)

|     | INF   | CLD    |
| --- | ----- | ------ |
| β = | 0     | −1/30  |
| d0 = | ∞    | 583.06 |
| d8 = | 11.67 | 15.81  |
| d11 = | 7.01 | 2.87   |
| Bf = | 39.00 | 39.00  |

(Values for Conditional Expressions)

(1) f/(−fa) = 0.90
(2) f/(−f1) = 0.64
(3) (r2 + r1)/(r2 − r1) = −1.7
(4) f1/f2 = 0.30

Figure 4:
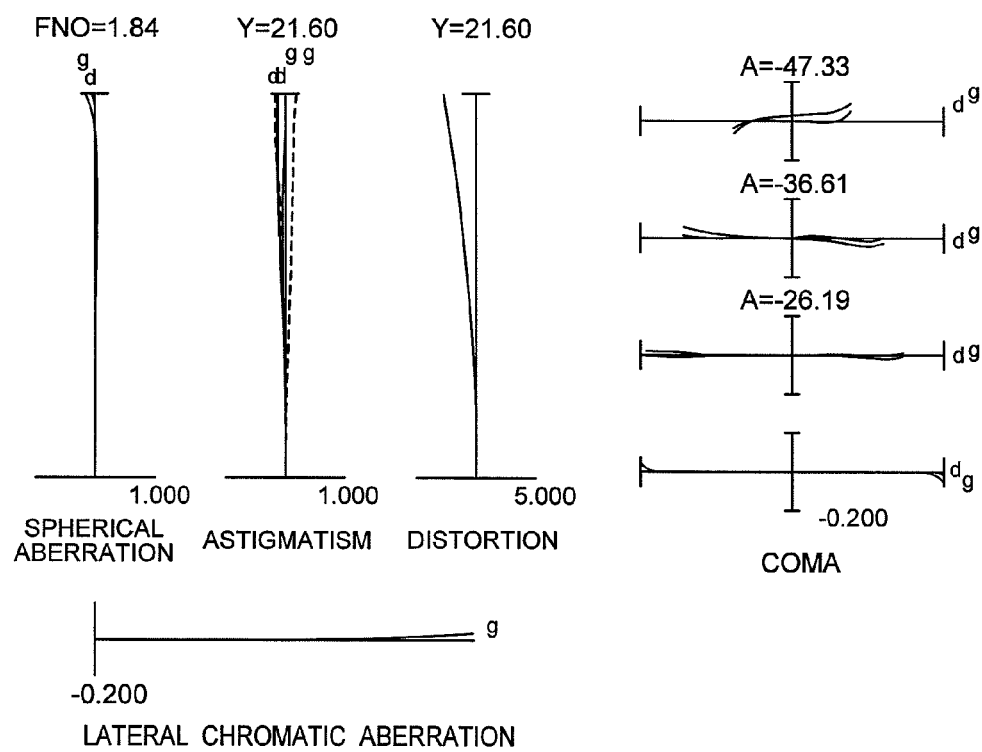
FIG. 4 shows graphs representing various aberrations of the imaging lens according to Example 2 upon focusing on an infinitely distant object.

FIG. 4 shows graphs representing various aberrations of the imaging lens SL2 according to Example 2 upon focusing on an infinitely distant object. As is apparent from FIG. 4, the imaging lens SL2 according to Example 2 shows superb optical performance as a result of good corrections to various aberrations.

Example 3

Figure 5:
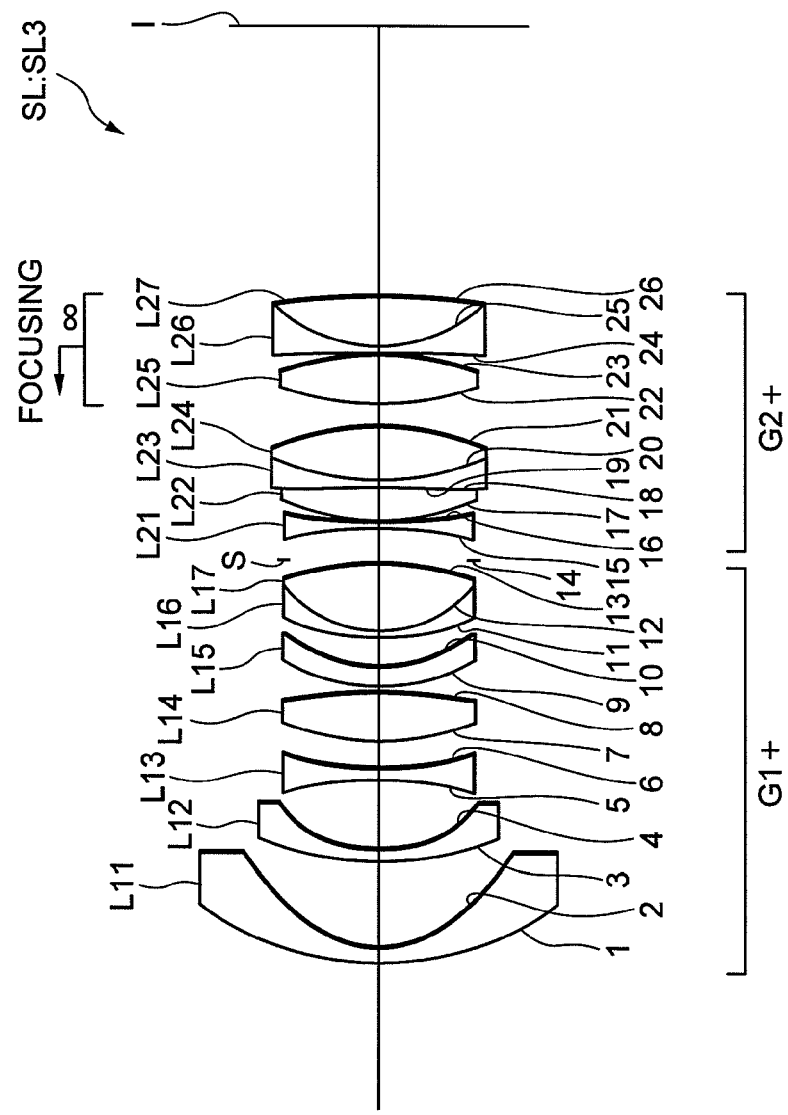
FIG. 5 is a sectional view showing a lens configuration of an imaging lens according to Example 3 of the present application.

FIG. 5 is a sectional view showing a lens configuration of an imaging lens SL3 according to Example 3 of the present application. In the imaging lens SL3 according to Example 3 shown in FIG. 5, the first lens group G1 is composed of, in order from an object side, a negative meniscus lens L11 (first lens component or first lens) having a convex surface facing the object side, a negative meniscus lens L12 (second lens component or second lens) having a convex surface facing the object side, a double concave lens L13 (third lens component), a double convex lens L14, a negative meniscus lens L15 having a convex surface facing the object side, and a cemented lens constructed by a negative meniscus lens L16 having a convex surface facing the object side cemented with a double convex lens L17. Moreover, an aspherical surface formed by means of glass molding is formed on the image side lens surface of each of the negative meniscus lens L11 having the convex surface facing the object side and the negative meniscus lens L12 having the convex surface facing the object side.

The second lens group G2 is composed of, in order from the object side, a double concave lens L21, a double convex lens L22, a cemented lens constructed by a double concave lens L23 cemented with a double convex lens L24, a double convex lens L25, and a cemented lens constructed by a double concave lens L26 cemented with a double convex lens L27. An aspherical surface is formed on the object side lens surface of the double concave lens L26.

In the imaging lens SL3 according to Example 3, the double convex lens L25 and the cemented lens constructed by the double concave lens L26 cemented with the double convex lens L27 in the second lens group G2 are moved to the object side, thereby carrying out focusing from an infinitely distant object to a close object.

Various values associated with the imaging lens SL3 according to Example 3 are listed in Table 3.

TABLE 3

(Specifications)
f = 18.4
2ω = 100.3°
FNO = 1.84

(Lens Data)

| i | r | d | νd | nd |
| --- | --- | --- | --- | --- |
| 1 | 46.689 | 2.50 | 55.34 | 1.67790 |
| *2 | 15.662 | 12.59 | | |
| 3 | 49.621 | 2.00 | 52.64 | 1.74100 |
| *4 | 24.385 | 10.01 | | |
| 5 | −52.182 | 2.00 | 82.52 | 1.49782 |
| 6 | 48.151 | 3.96 | | |
| 7 | 42.796 | 7.47 | 39.58 | 1.80440 |
| 8 | −70.815 | 0.80 | | |
| 9 | 29.872 | 3.00 | 42.71 | 1.83481 |
| 10 | 22.318 | 4.17 | | |
| 11 | 38.373 | 1.00 | 47.04 | 1.62374 |
| 12 | 18.570 | 10.45 | 64.10 | 1.51680 |
| 13 | −44.148 | 0.10 | | |
| 14 | ∞ | 5.00 | Aperture Stop S | |
| 15 | −51.745 | 1.00 | 42.72 | 1.83481 |
| 16 | 81.989 | 0.10 | | |
| 17 | 38.285 | 4.90 | 50.80 | 1.57099 |
| 18 | −193.104 | 0.11 | | |
| 19 | −249.218 | 1.00 | 49.45 | 1.77279 |
| 20 | 41.277 | 8.31 | 82.52 | 1.49782 |
| 21 | −37.820 | (d21) | | |
| 22 | 46.769 | 7.54 | 82.52 | 1.49782 |
| 23 | −42.145 | 0.10 | | |
| *24 | −602.680 | 1.00 | 40.92 | 1.80610 |
| 25 | 23.141 | 7.63 | 61.13 | 1.58913 |
| 26 | −97.706 | (Bf) | | |

(Lens Group Data)

| Group | I | focal length |
| --- | --- | --- |
| G1 | 1 | 48.37 |
| G2 | 15 | 59.19 |

(Aspherical Surface Data)

Surface Number: 2

κ = 0.0671
A4 = 7.12460E−06
A6 = 1.50230E−08
A8 = −5.73850E−11
A10 = 0.00000E+00

Surface Number: 4

κ = 2.0611
A4 = 5.92490E−06
A6 = 1.13480E−08
A8 = 8.21020E−11
A10 = 0.00000E+00

Surface Number: 24

κ = 1.0000
A4 = −6.78210E−06
A6 = −7.69510E−09
A8 = 3.12160E−11
A10 = −7.67700E−14

TABLE 3-continued (Specifications)
f = 18.4
2ω = 100.3°
FNO = 1.84

(Variable Distances)

|  | INF | CLD |
|---|---|---|
| β = | 0 | −1/30 |
| d0 = | ∞ | 532.34 |
| d21 = | 3.25 | 2.61 |
| Bf = | 40.05 | 40.68 |

(Values for Conditional Expressions)

(1) f/(−fa) = 0.89
(2) f/(−f1) = 0.51
(3) (r2 + r1)/(r2 − r1) = −2.0
(4) f1/f2 = 0.54

Figure 6:
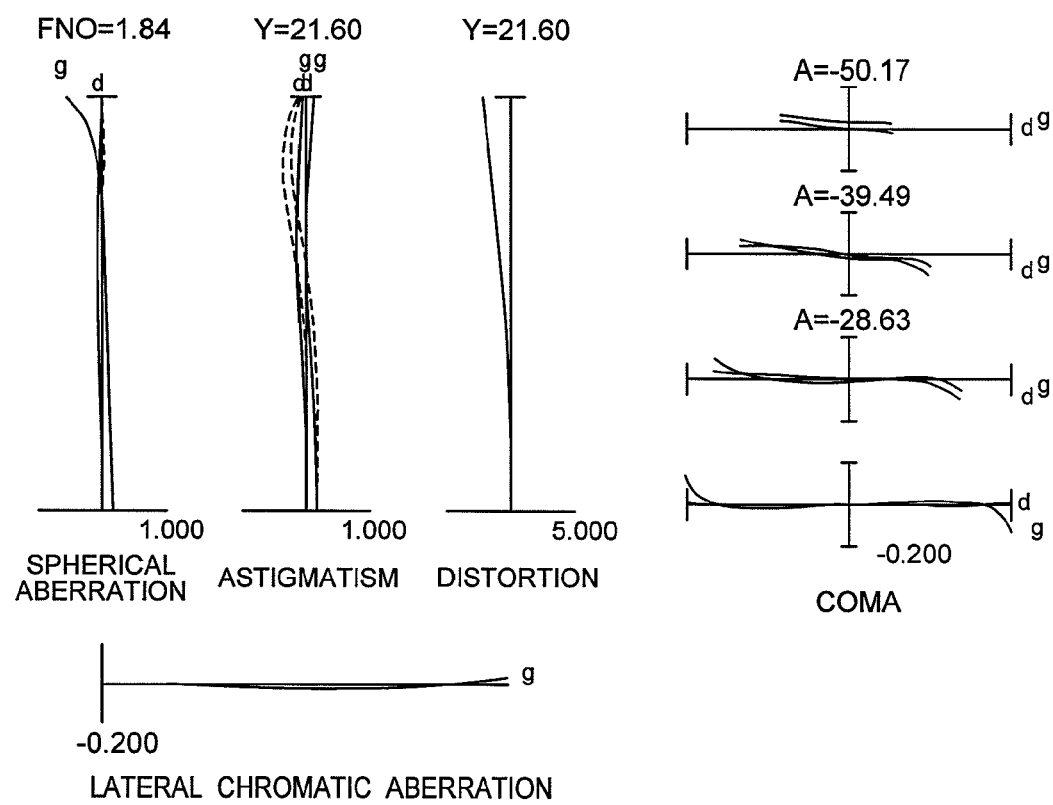
FIG. 6 shows graphs representing various aberrations of the imaging lens according to Example 3 upon focusing on an infinitely distant object.

FIG. 6 shows graphs representing various aberrations of the imaging lens SL3 according to Example 3 upon focusing on an infinitely distant object. As is apparent from FIG. 6, the imaging lens SL3 according to Example 3 shows superb optical performance as a result of good corrections to various aberrations.

Example 4

Figure 7:
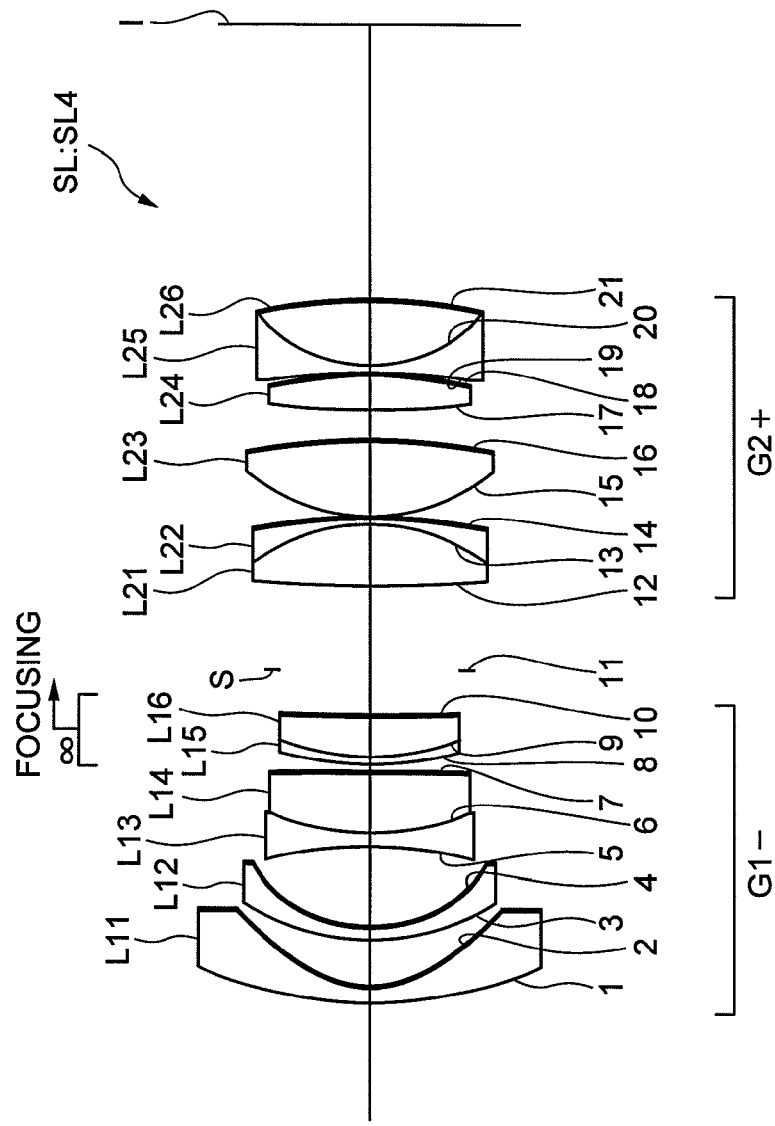
FIG. 7 is a sectional view showing a lens configuration of an imaging lens according to Example 4 of the present application.

FIG. 7 is a sectional view showing a lens configuration of an imaging lens SL4 according to Example 4 of the present application. In the imaging lens SL4 according to Example 4 shown in FIG. 7, the first lens group G1 is composed of, in order from an object side, a negative meniscus lens L11 (first lens component or first lens) having a convex surface facing the object side, a negative meniscus lens L12 (second lens component or second lens) having a convex surface facing the object side, a cemented lens (third lens component) constructed by a double concave lens L13 cemented with a double convex lens L14, and a cemented lens constructed by a negative meniscus lens L15 having a convex surface facing the object side cemented with a positive meniscus lens L16 having a convex surface facing the object side. An aspherical surface formed by means of glass molding is formed on the image side lens surface of each of the negative meniscus lens L11 having the convex surface facing the object side and the negative meniscus lens L12 having the convex surface facing the object side.

The second lens group G2 is composed of, in order from the object side, a cemented lens constructed by a double convex lens L21 cemented with a negative meniscus lens L22 having a concave surface facing the object side, a double convex lens L23, a double convex lens L24, and a cemented lens constructed by a double concave lens L25 cemented with a double convex lens L26. An aspherical surface is formed on the object side lens surface of the double concave lens L25.

In the imaging lens SL4 according to Example 4, the cemented lens constructed by the negative meniscus lens L15 having the convex surface facing the object side cemented with the positive meniscus lens L16 having the convex surface facing the object side is moved to the image plane side, thereby carrying out focusing from an infinitely distant object to a close object.

Various values associated with the imaging lens SL4 according to Example 4 are listed in Table 4.

TABLE 4

(Specifications)
f = 20.5
2ω = 94.5°
FNO = 1.85

(Lens Data)

| i | r | d | νd | nd |
|---|---|---|---|---|
| 1 | 63.744 | 2.50 | 55.34 | 1.67790 |
| *2 | 15.500 | 6.48 | | |
| 3 | 34.255 | 2.00 | 52.64 | 1.74100 |
| *4 | 25.218 | 10.88 | | |
| 5 | −57.486 | 2.00 | 82.52 | 1.49782 |
| 6 | 38.579 | 8.73 | 39.58 | 1.80440 |
| 7 | −1431.273 | (d7) | | |
| 8 | 53.305 | 1.00 | 42.71 | 1.83481 |
| 9 | 37.094 | 6.02 | 47.04 | 1.62374 |
| 10 | 507.844 | (d10) | | |
| 11 | ∞ | 12.08 | Aperture Stop S | |
| 12 | 258.113 | 8.66 | 82.52 | 1.49782 |
| 13 | −27.323 | 1.00 | 49.45 | 1.77279 |
| 14 | −85.607 | 0.10 | | |
| 15 | 27.957 | 10.77 | 82.52 | 1.49782 |
| 16 | −87.769 | 4.29 | | |
| 17 | 156.732 | 5.08 | 82.52 | 1.49782 |
| 18 | −69.917 | 0.10 | | |
| *19 | −272.320 | 1.00 | 40.92 | 1.80610 |
| 20 | 21.000 | 9.47 | 61.13 | 1.58913 |
| 21 | −75.047 | (Bf) | | |

(Lens Group Data)

| Group | I | focal length |
|---|---|---|
| G1 | 1 | −42.24 |
| G2 | 12 | 38.36 |

(Aspherical Surface Data)

Surface Number: 2

κ = 0.4420
A4 = −1.36385E−05
A6 = −2.78020E−08
A8 = −6.54972E−11
A10 = 5.23238E−14

Surface Number: 4

κ = −0.2325
A4 = 2.45601E−05
A6 = 3.40714E−08
A8 = 1.25606E−10
A10 = −1.51997E−14

Surface Number: 19

κ = 0.0000
A4 = −1.35372E−05
A6 = −1.06042E−08
A8 = −1.45748E−11
A10 = 0.00000E+00

(Variable Distances)

|  | INF | CLD |
|---|---|---|
| β = | 0 | −1/30 |
| d0 = | ∞ | 591.96 |
| d7 = | 1.05 | 2.48 |
| d10 = | 6.23 | 4.80 |
| Bf = | 39.00 | 39.00 |

TABLE 4-continued (Specifications)
f = 20.5
2ω = 94.5°
FNO = 1.85

(Values for Conditional Expressions)

(1) f/(−fa) = 0.86
(2) f/(−f1) = 0.66
(3) (r2 + r1)/(r2 − r1) = −1.6
(4) f1/f2 = 0.22

Figure 8:
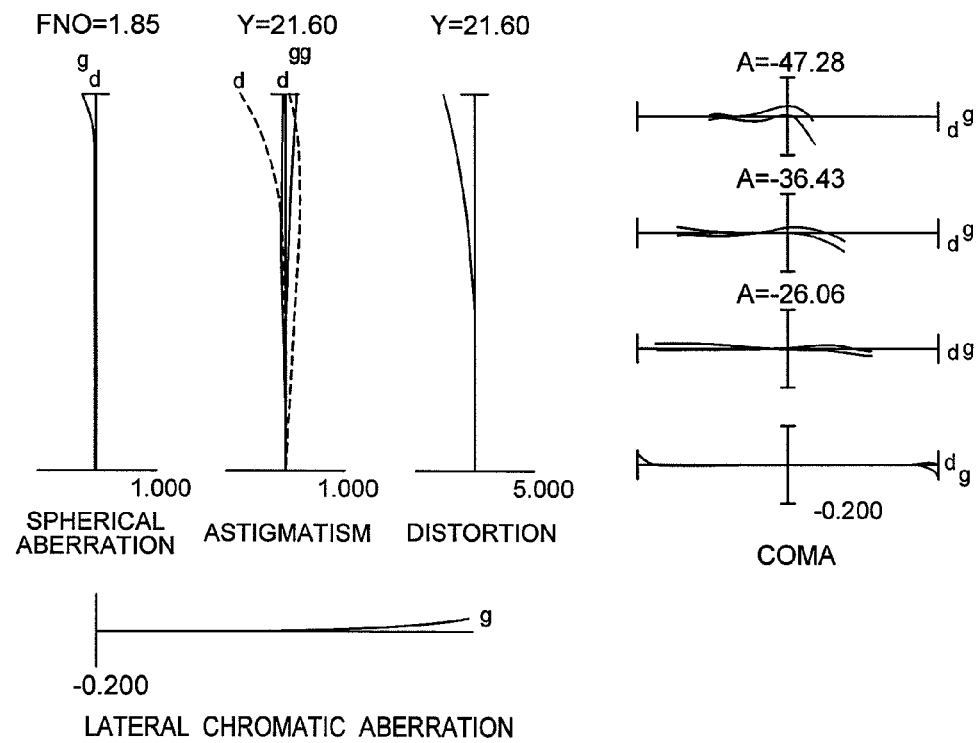
FIG. 8 shows graphs representing various aberrations of the imaging lens according to Example 4 upon focusing on an infinitely distant object.

FIG. 8 shows graphs representing various aberrations of the imaging lens SL4 according to Example 4 upon focusing on an infinitely distant object. As is apparent from FIG. 8, the imaging lens SL4 according to Example 4 shows superb optical performance as a result of good corrections to various aberrations.

Example 5

Figure 9:
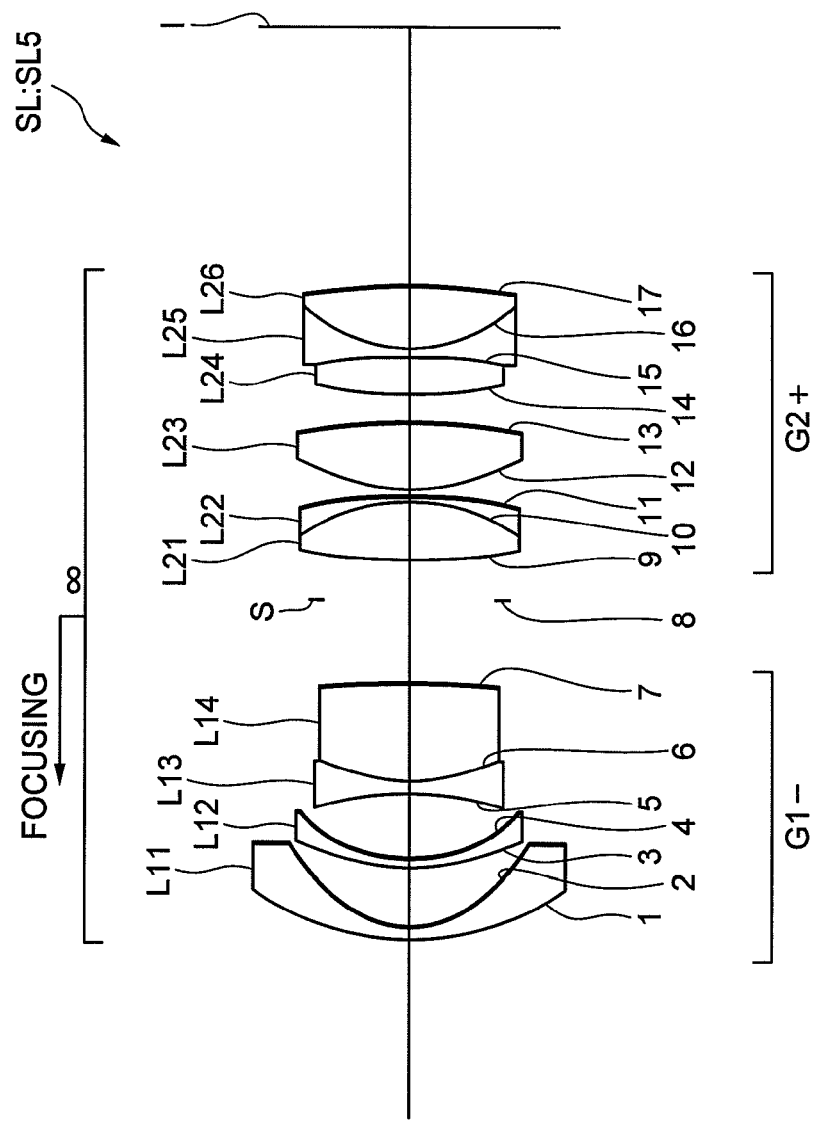
FIG. 9 is a sectional view showing a lens configuration of an imaging lens according to Example 5 of the present application.

FIG. 9 is a sectional view showing a lens configuration of an imaging lens SL5 according to Example 5 of the present application. In the imaging lens SL5 according to Example 5, the first lens group G1 is composed of, in order from an object side, a negative meniscus lens L11 (first lens component or first lens) having a convex surface facing the object side, a negative meniscus lens L12 (second lens component or second lens) having a convex surface facing the object side, and a cemented lens (third lens component) constructed by a double concave lens L13 cemented with a double convex lens L14. An aspherical surface formed by means of glass molding is formed on the object side lens surface of each of the negative meniscus lens L11 having the convex surface facing the object side and the negative meniscus lens L12 having the convex surface facing the object side. Moreover, an aspherical surface is formed on the object side lens surface of the double convex lens L13.

The second lens group G2 is composed of, in order from the object side, a cemented lens constructed by a double convex lens L21 cemented with a negative meniscus lens L22 having a concave surface facing the object side, a double convex lens L23, and a cemented lens constructed by a double convex lens L24 cemented with a double concave lens L25 cemented with a double convex lens L26. An aspherical surface is formed on the image plane side lens surface of the double convex lens L26.

In the imaging lens SL5 according to Example 5, the whole of the imaging lens SL5 is moved to the object side, thereby carrying out focusing from an infinitely distant object to a close object.

Various values associated with the imaging lens SL5 according to Example 5 are listed in Table 5.

TABLE 5

(Specifications)
f = 20.2
2ω = 97.4°
FNO = 1.85

(Lens Data)

| i | r | d | νd | nd |
|---|---|---|----|-----|
| 1 | 43.400 | 2.00 | 55.34 | 1.67790 |
| *2 | 14.700 | 8.80 | | |
| 3 | 40.930 | 1.50 | 52.64 | 1.74100 |

TABLE 5-continued (Specifications)
f = 20.2
2ω = 97.4°
FNO = 1.85

| *4 | 31.487 | 9.55 | | |
|----|--------|------|-------|---------|
| *5 | −44.271 | 2.00 | 82.52 | 1.49782 |
| 6 | 34.432 | 15.00 | 39.58 | 1.80440 |
| 7 | −144.886 | 12.46 | | |
| 8 | ∞ | 6.42 | Aperture Stop S | |
| 9 | 119.763 | 8.74 | 82.52 | 1.49782 |
| 10 | −28.514 | 1.00 | 49.45 | 1.77280 |
| 11 | −70.685 | 0.99 | | |
| 12 | 34.375 | 10.24 | 82.52 | 1.49782 |
| 13 | −87.851 | 4.21 | | |
| 14 | 69.680 | 5.54 | 82.52 | 1.49782 |
| 15 | −78.466 | 1.39 | 40.92 | 1.80610 |
| 16 | 23.736 | 9.60 | 61.13 | 1.58913 |
| *17 | −52.519 | (Bf) | | |

(Lens Group Data)

| Group | I | focal length |
|-------|---|--------------|
| G1 | 1 | −35.31 |
| G2 | 9 | 37.17 |

(Aspherical Surface Data)

Surface Number: 2

κ = 0.4759
A4 = −1.10225E−05
A6 = −2.84986E−09
A8 = −8.83468E−11
A10 = −3.30023E−14

Surface Number: 4

κ = −0.2716
A4 = 2.31803E−05
A6 = 3.75925E−09
A8 = 2.32637E−10
A10 = −3.37989E−13

Surface Number: 5

κ = −0.2538
A4 = 3.04922E−07
A6 = 3.27983E−09
A8 = −2.25260E−11
A10 = 2.77982E−14

Surface Number: 17

κ = −9.7414
A4 = 4.25887E−06
A6 = 1.37568E−08
A8 = 2.57088E−11
A10 = 0.00000E+00

(Variable Distances)

| | INF | CLD |
|---|-----|-----|
| β = | 0 | −1/100 |
| d0 = | ∞ | 2000.026 |
| Bf = | 39.000 | 39.202 |

(Values for Conditional Expressions)

(1) f/(−fa) = 0.73
(2) f/(−f1) = 0.59
(3) (r2 + r1)/(r2 − r1) = −2.0
(4) f1/f2 = 0.17

Figure 10:
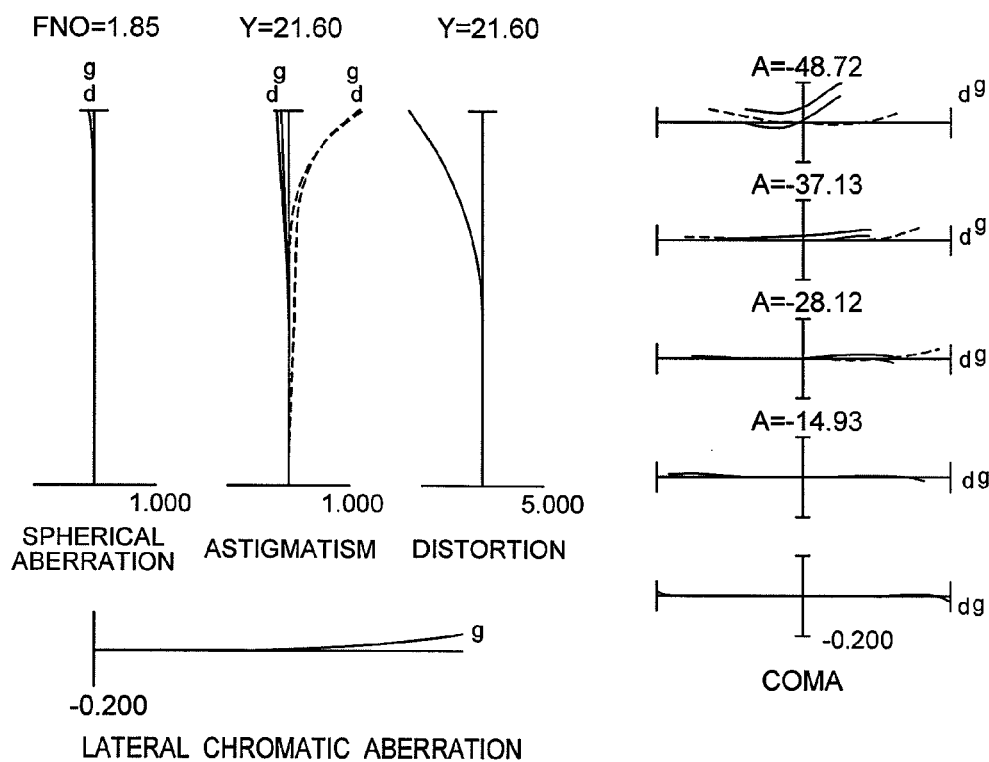
FIG. 10 shows graphs representing various aberrations of the imaging lens according to Example 5 upon focusing on an infinitely distant object.

FIG. 10 shows graphs representing various aberrations of the imaging lens SL5 according to Example 5 upon focusing on an infinitely distant object. As is apparent from FIG. 10, the imaging lens SL5 according to Example 5 shows superb optical performance as a result of good corrections to various aberrations.

Figure 11:
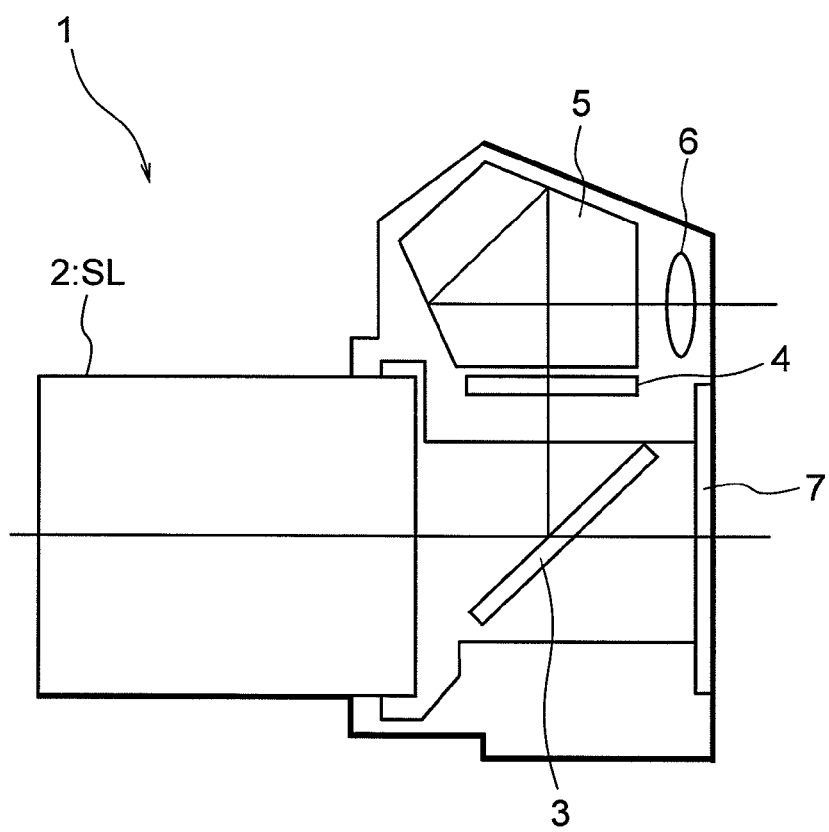
FIG. 11 is a sectional view showing a construction of a single-lens reflex digital camera equipped with an imaging lens according to the present embodiment.

FIG. 11 shows a schematic sectional view of a single-lens reflex digital camera 1 (which will hereinafter simply be termed a camera) by way of an optical apparatus equipped with the imaging lens SL described above. In the camera 1, light rays from an unillustrated object (an object to be imaged) are converged by an imaging lens 2 (the imaging lens SL), and an image is formed on a focusing screen 4 via a quick return mirror 3. Then, the light rays, of which the image is formed on the focusing screen 4, are reflected plural times within a pentagonal roof prism 5 and led to an eyepiece 6. A photographer is thereby capable of observing the object (the object to be imaged) as an erected image via the eyepiece 6.

Moreover, when the photographer presses an unillustrated release button, the quick return mirror 3 retreats outside of an optical path, and the light rays from the unillustrated object (the object to be imaged), which are converged by the imaging lens 2, form an object image on an imaging device 7. The image of the light rays from the object (the object to be imaged) is thereby formed by the imaging device 7 and stored as an image of the object (the object to be imaged) in an unillustrated memory. Thus, the photographer can photograph the object (the object to be imaged) by use of the present camera 1. Note that the camera 1 illustrated in FIG. 11 may be constructed to retain the imaging lens SL in an attachable/detachable manner and may also be constructed integrally with the imaging lens SL. Moreover, the camera 1 may be constructed as a so-called single-lens reflex camera and may also be constructed as a compact camera (mirror-less camera) including none of the quick return mirror.

Incidentally, the following description may suitably be applied within limits that do not deteriorate optical performance.

Although a two-lens-group configuration is shown as the above-described explanations and each Example of the present application, the present application is not limited to this, and another lens-group configuration such as a three-lens-group configuration is possible. Specifically, a lens configuration that a lens or a lens group is added to the most object side of the imaging lens according to the present application is possible. Moreover, a lens configuration that a lens or a lens group is added to the most image side of the imaging lens according to the present application is also possible. Incidentally, a lens group is a portion that includes at least one lens and is separated by air spaces.

In an imaging lens according to the present application, in order to carry out focusing from an infinitely distant object to a close object, a portion of a lens group, a lens group, or a plurality of lens groups may be moved along the optical axis as a focusing lens group. Moreover, such a focusing lens group is suitable for auto focusing, and is suitable for being driven by a motor for auto focusing such as an ultrasonic motor. It is particularly preferable that at least a portion of the first lens group G1 or the second lens group G2 is used as the focusing lens group.

A lens group or a portion of a lens group may be shifted in a direction including a component perpendicular to the optical axis as a vibration reduction lens group, or tilted (swayed) in a direction including the optical axis for correcting an image blur caused by a camera shake. It is particularly preferable that at least a portion of the second lens group G2 is used as the vibration reduction lens group.

Any lens surface of a lens composing an imaging lens according to the present application may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the surface is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. Any lens surface may be a diffractive optical surface, and any lens may be a graded-index type lens (GRIN lens) or a plastic lens.

An antireflection coating having high transmittance over a broad wavelength range may be applied to each lens surface of a wide-angle lens according to the present application to reduce flare or ghost images, so that high optical performance with high contrast can be attained.

Above-described each example only shows a specific example for the purpose of better understanding of the present invention. Accordingly, it is needless to say that the invention in its broader aspect is not limited to the specific details and representative devices shown and described herein.

What is claimed is:

1. An imaging lens comprising, in order from an object side:

a first lens group; and a second lens group having positive refractive power, the first lens group including, in order from the object side, a first lens component having a negative meniscus shape with a convex surface facing the object side, a second lens component having a negative meniscus shape with a convex surface facing the object side, and a third lens component, at least one of the first lens component and the second lens component including an aspherical surface on an image plane side lens surface, the third lens component including a double concave lens to the most object side, the imaging lens including at least six lens components, and the following conditional expression being satisfied:

$$0.65 < f/(-fa) < 1.15$$

where f denotes a focal length of the imaging lens, and fa denotes a combined focal length of the first lens component and the second lens component.

2. The imaging lens according to claim 1, wherein an aperture stop is disposed between the first lens group and the second lens group.

3. The imaging lens according to claim 1, wherein upon carrying out focusing from an infinitely distant object to a close object, a distance between the first lens group and the second lens group is fixed, and each distance between respective lenses in the first lens group and the second lens group is fixed.

4. The imaging lens according to claim 1, wherein at least a portion of the first lens group is a focusing lens group.

5. The imaging lens according to claim 1, wherein at least a portion of the second lens group is a focusing lens group.

6. The imaging lens according to claim 1, wherein the following conditional expression is satisfied:

$$0.40 < f/(-f1) < 0.75$$

where f denotes the focal length of the imaging lens, and f1 denotes a focal length of the first lens component.

7. The imaging lens according to claim 1, wherein the following conditional expression is satisfied:

$$-4.0 < (r2+r1)/(r2-r1) < -1.1$$

where r1 denotes a radius of curvature of the object side lens surface of the first lens component, and r2 denotes a radius of curvature of the image plane side lens surface of the first lens component.

8. The imaging lens according to claim 1, wherein the following conditional expression is satisfied:

$$0.10<f1/f2<1.00$$

where f1 denotes the focal length of the first lens component, and f2 denotes a focal length of the second lens component.

9. An optical apparatus equipped with the imaging lens according to claim 1.

10. An imaging lens comprising, in order from an object side:

a first lens group; and
a second lens group having positive refractive power,
the first lens group including, in order from the object side, a first lens component, and a second lens component,
each of the first lens component and the second lens component including an aspherical surface formed by means of glass molding,
at least one of said aspheric surfaces formed on the first lens component and the second lens component being on an image plane side lens surface, and
the imaging lens including at least six lens components,
wherein the following conditional expression is satisfied:

$$-4.0<(r2+r1)/(r2-r1)<-1.1$$

where r1 denotes a radius of curvature of the object side lens surface of the first lens component, and r2 denotes a radius of curvature of the image plane side lens surface of the first lens component.

11. The imaging lens according to claim 10, wherein each of the first lens component and the second lens component is a negative meniscus lens having a convex surface facing the object side.

12. The imaging lens according to claim 10, wherein the following conditional expression is satisfied:

$$0.65<f/(-fa)<1.15$$

where f denotes a focal length of the imaging lens, and fa denotes a combined focal length of the first lens component and the second lens component.

13. The imaging lens according to claim 10, wherein the following conditional expression is satisfied:

$$0.40<f/(-f1)<0.75$$

where f denotes a focal length of the imaging lens, and f1 denotes a focal length of the first lens component.

14. The imaging lens according to claim 10, wherein the following conditional expression is satisfied:

$$0.10<f1/f2<1.00$$

where f1 denotes a focal length of the first lens component, and f2 denotes a focal length of the second lens component.

15. An optical apparatus equipped with the imaging lens according to claim 10.

16. A method for manufacturing an imaging lens including, in order from an object side, a first lens group, and a second lens group having positive refractive power, the method comprising steps of:

disposing, in order from the object side, a first lens component with a negative meniscus shape having a convex surface facing the object side, a second lens component with a negative meniscus shape having a convex surface facing the object side, and a third lens component into the first lens group,
at least one of the first lens component and the second lens component including an aspherical surface on an image plane side lens surface;
disposing a double concave lens to the most object side of the third lens component;
disposing the first and second lens groups so that the imaging lens has at least six lens components; and
satisfying the following conditional expression:

$$0.65<f/(-fa)<1.15$$

where f denotes a focal length of the imaging lens, and fa denotes a combined focal length of the first lens component and the second lens component.

17. The method according to claim 16, further comprising a step of:

disposing the first lens component with satisfying the following conditional expression:

$$0.40<f/(-f1)<0.75$$

where f denotes the focal length of the imaging lens, and f1 denotes a focal length of the first lens component.

18. The method according to claim 16, further comprising a step of:

disposing the first lens component with satisfying the following conditional expression:

$$-4.0<(r2+r1)/(r2-r1)<-1.1$$

where r1 denotes a radius of curvature of the object side lens surface of the first lens component, and r2 denotes a radius of curvature of the image plane side lens surface of the first lens component.

19. The method according to claim 16, further comprising a step of:

disposing the first lens component and the second lens component with satisfying the following conditional expression:

$$0.10<f1/f2<1.00$$

where f1 denotes a focal length of the first lens component, and f2 denotes a focal length of the second lens component.

20. A method for manufacturing an imaging lens including, in order from an object side, a first lens group, and a second lens group having positive refractive power, the method comprising steps of:

disposing, in order from the object side, a first lens component, and a second lens component into the first lens group;
disposing an aspherical surface formed by means of glass molding in each of the first lens component and the second lens component so that at least one of said aspherical surfaces formed on the first lens component and the second lens component is on an image plane side lens surface;
disposing the first and second lens groups so that the imaging lens has at least six lens components; and
satisfying the following conditional expression:

$$-4.0<(r2+r1)/(r2-r1)<-1.1$$

where r1 denotes a radius of curvature of the object side lens surface of the first lens component, and r2 denotes a radius of curvature of the image plane side lens surface of the first lens component.

21. The method according to claim 20, further comprising a step of:
   disposing each of the first lens component and the second lens component with a negative meniscus lens having a convex surface facing the object side.

22. The method according to claim 20, further comprising a step of:
   disposing the first lens component and the second lens component with satisfying the following conditional expression:

$0.65 < f/(-fa) < 1.15$ where f denotes a focal length of the imaging lens, and fa denotes a combined focal length of the first lens component and the second lens component.

23. An imaging lens comprising,
   in order from an object side:
   a first lens group; and
   a second lens group having positive refractive power,
   the first lens group including, in order from the object side, a first lens component having a negative meniscus shape with a convex surface facing the object side, a second lens component having a negative meniscus shape with a convex surface facing the object side, and a third lens component,
   the third lens component including a double concave lens to the most object side,
   the imaging lens including at least six lens components, and
   the following conditional expressions being satisfied:

$0.65 < f/(-fa) < 1.15$ $-2.0 \le (r2+r1)/(r2-r1) < -1.1$ where f denotes a focal length of the imaging lens, fa denotes a combined focal length of the first lens component and the second lens component, r1 denotes a radius of curvature of the object side lens surface of the first lens component, and r2 denotes a radius of curvature of the image plane side lens surface of the first lens component.

24. An imaging lens comprising,
   in order from an object side:
   a first lens group; and
   a second lens group having positive refractive power,
   the first lens group including, in order from the object side, a first lens component having a negative meniscus shape with a convex surface facing the object side, a second lens component having a negative meniscus shape with a convex surface facing the object side, and a third lens component,
   the third lens component including a double concave lens to the most object side,
   the imaging lens including at least six lens components, and
   the following conditional expressions being satisfied:

$0.65 < f/(-fa) < 1.15$ $0.10 < f1/f2 \le 0.54$ where f denotes a focal length of the imaging lens, fa denotes a combined focal length of the first lens component and the second lens component, f1 denotes a focal length of the first lens component, and f2 denotes a focal length of the second lens component.

25. A method for manufacturing an imaging lens including, in order from an object side, a first lens group and a second lens group having positive refractive power, the method comprising steps of:
   disposing, in order from the object side, a first lens component with a negative meniscus shape having a convex surface facing the object side, a second lens component with a negative meniscus shape having a convex surface facing the object side, and a third lens component into the first lens group;
   disposing a double concave lens to the most object side of the third lens component;
   disposing the first and second lens groups so that the imaging lens has at least six lens components; and
   satisfying the following conditional expressions:

$0.65 < f/(-fa) < 1.15$ $-2.0 \le (r2+r1)/(r2-r1) < -1.1$ where f denotes a focal length of the imaging lens, fa denotes a combined focal length of the first lens component and the second lens component, r1 denotes a radius of curvature of the object side lens surface of the first lens component, and r2 denotes a radius of curvature of the image plane side lens surface of the first lens component.

26. A method for manufacturing an imaging lens including, in order from an object side, a first lens group and a second lens group having positive refractive power, the method comprising steps of:
   disposing, in order from the object side, a first lens component with a negative meniscus shape having a convex surface facing the object side, a second lens component with a negative meniscus shape having a convex surface facing the object side, and a third lens component into the first lens group;
   disposing a double concave lens to the most object side of the third lens component;
   disposing the first and second lens groups so that the imaging lens has at least six lens components; and
   satisfying the following conditional expressions:

$0.65 < f/(-fa) < 1.15$ $0.10 < f1/f2 \le 0.54$ where f denotes a focal length of the imaging lens, fa denotes a combined focal length of the first lens component and the second lens component, f1 denotes a focal length of the first lens component, and f2 denotes a focal length of the second lens component.

* * * * *